(12) United States Patent
Grayson et al.

(10) Patent No.: US 8,233,481 B2
(45) Date of Patent: Jul. 31, 2012

(54) ACCESS CLASS BASED PICOCELL POLICY ENFORCEMENT

(75) Inventors: Mark Grayson, Berkshire (GB); Anton Okmyanskiy, Vancouver (CA); Rajesh Pazhyannur, Sunnyvale, CA (US); Eric P. Hamel, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 12/509,811

(22) Filed: Jul. 27, 2009

(65) Prior Publication Data

US 2011/0021196 A1    Jan. 27, 2011

(51) Int. Cl.
H04L 12/28    (2006.01)
(52) U.S. Cl. .......................... 370/392; 370/356; 370/401
(58) Field of Classification Search .......... 370/352–356, 370/401–427, 392–427; 455/435.1–460
See application file for complete search history.

(56) References Cited

U.S. PATENT DOCUMENTS

| | | | |
|---|---|---|---|
| 7,486,966 B2 | 2/2009 | Sayers et al. | |
| 8,041,335 B2* | 10/2011 | Khetawat et al. | 455/404.2 |
| 2009/0156213 A1* | 6/2009 | Spinelli et al. | 455/436 |
| 2010/0291897 A1* | 11/2010 | Ghai | 455/410 |

OTHER PUBLICATIONS

3GPP TS 25.469, 3rd Generation Partnership Project, Technical Specification Group Radio Access Network, UTRAN Iuh interface Home Node B Application Part (HNBAP) signalling (Release 8), Jun. 2009, pp. 1-59.

* cited by examiner

Primary Examiner — Pao Sinkantarakorn
Assistant Examiner — Iqbal Zaidi
(74) Attorney, Agent, or Firm — Edell, Shapiro & Finnan, LLC

(57) ABSTRACT

Methods and systems for providing access class based picocell policy enforcement includes determining whether user equipment registered with a radio access point is known to an enterprise other than a macro telecommunications service provider and eligible for differentiated services, recovering an internet protocol (IP) address associated with communication traffic from the user equipment, confirming that the IP address associated with communication traffic from the user equipment is within a predetermined range, determining whether the IP address associated with communication traffic from the user equipment uniquely identifies an enterprise context, as opposed to a macro telecommunications service context, and when the IP address associated with communication traffic from the user equipment uniquely identifies an enterprise context, causing IP packets received from the Internet to be routed to an enterprise controller that services the user equipment via the radio access point.

16 Claims, 7 Drawing Sheets

| Service Class | Silver | Bronze | Bronze | Gold | Gold | Bronze | Gold | Gold | Silver | Silver | Gold | Silver |
|---|---|---|---|---|---|---|---|---|---|---|---|---|
| | IMSI | IMSI | IMSI | IMSI | IMSI | IMSI | IMSI | IMSI | IMSI | IMSI | IMSI | IMSI |
| Enterprise #111 | | | | | | | | | | | | |
| Enterprise #112 | | | | | | | | | | | | |

*Fig. 2*

ACCESS CLASS BASED PICOCELL POLICY ENFORCEMENT

TECHNICAL FIELD

The present disclosure relates to enhanced customizable mobile communication infrastructure extensions and deployments.

BACKGROUND

Femtocell access point devices are radio access point devices that are deployed at subscriber sites in order to improve coverage of mobile wireless communication service (e.g., cell phone, wireless messaging, etc.) and thereby offload the burden on the infrastructure of the mobile service provider. Picocell access point devices operate substantially similarly to femtocell access point devices, but are typically more powerful and support more channels than femtocell access point devices. Both access point devices, as well as other like access point devices (referred to herein as "radio access points" or "RAPs") function, essentially, as cellular (or "cell") transceiver towers. Like cell towers, RAPs operate in a licensed spectrum that is subject to strict regulatory constraints on service providers.

Increasingly, RAPs are being deployed by enterprises, such as large corporations that want to extend mobile communication capabilities inside their own buildings and other facilities where conventional cellular tower service (also referred to herein as "macro" service) might not be available. Oftentimes RAPs are open access, allowing any cellular (both enterprise users and non-enterprise users) user access to the infrastructure.

BRIEF DESCRIPTION OF THE DRAWINGS

FIG. 2 shows example content of a policy database that is used to manage users of a given deployment of radio access points;

DESCRIPTION OF EXAMPLE EMBODIMENTS

Overview

Figure 1:
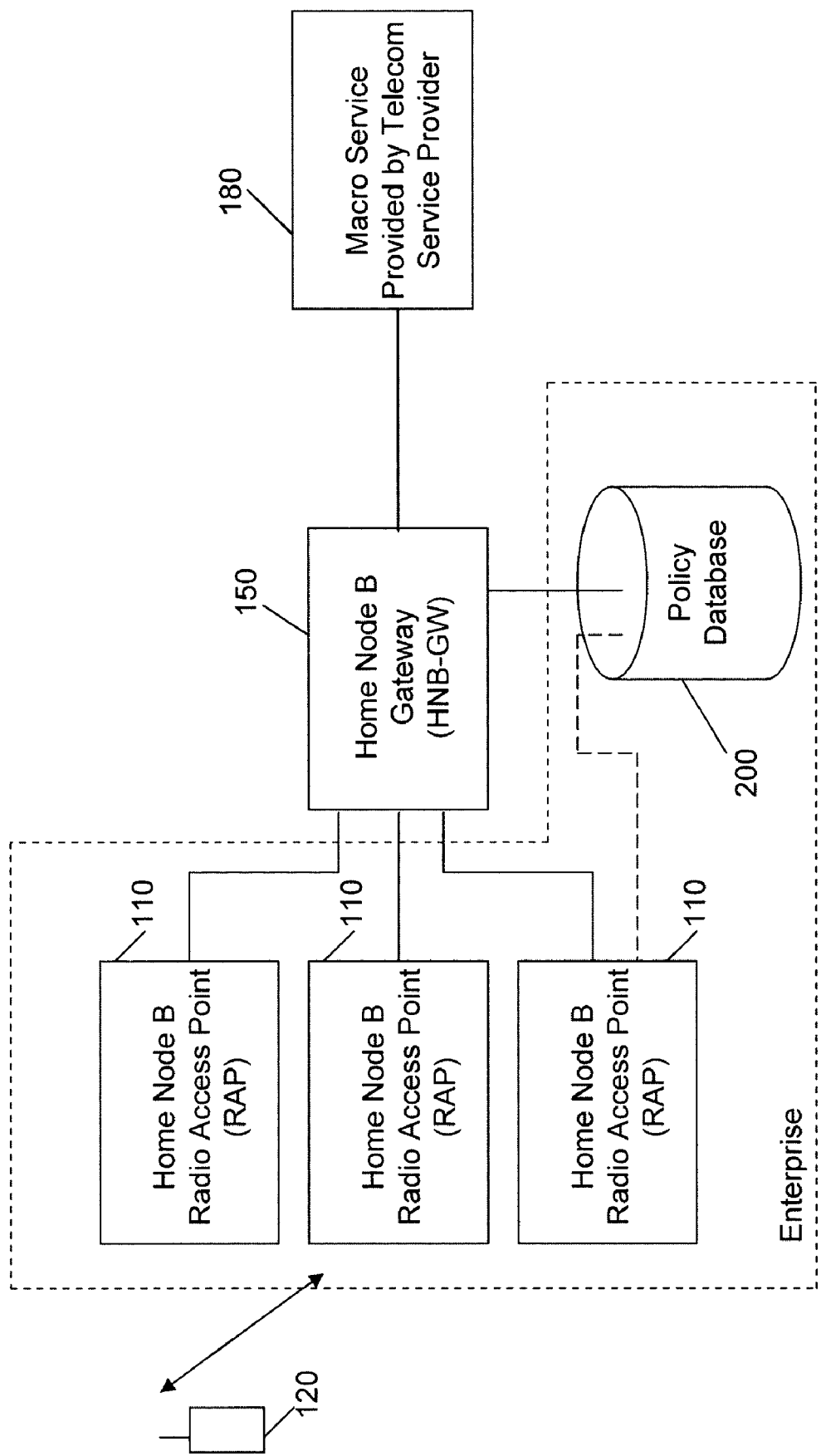
FIG. 1 depicts a radio access point topology in accordance with an embodiment described herein.

Systems and methods for managing radio access point infrastructure such as picocells are provided. A user equipment registration request is received at a node that manages a plurality of radio access points and enables connectivity with macro mobile communication services supplied by a service provide. In response to the user equipment registration request or concurrently with such request, a user equipment policy request is generated and sent to a policy database. A user equipment policy associated with the user equipment is received from the policy database, and thereafter user equipment traffic is treated in accordance with the user equipment policy. User traffic passed between, at least user equipment and one radio access point.

Further methods and systems are provided that determine whether user equipment registered with a radio access point, (e.g., a picocell) is known to an enterprise other than (or in addition to) a macro telecommunications service provider and thus eligible for differentiated services, e.g., is a picocell user an enterprise employee who is authorized to access private intranet, for instance. In one embodiment, the differentiated service provides for ability of enterprise users to receive access to resources via the enterprise network as opposed to the mobile (macro) service provider network. The method and system involves picocell equipment that is in communication with an internet protocol (IP) address database that is provisioned with the IP address ranges allocated by the enterprise to enterprise user equipment. The method and system further involves the picocell equipment being operable to recover an IP address associated with communication traffic from the user equipment and confirm that the IP address associated with communication traffic from the user equipment is within a predetermined range. In one embodiment, the picocell is operable to examine GPRS Tunneling Protocol (GTP) messages sent using the picocell equipment and to recover the IP address from such GTP messages. In a further enhancement, the picocell equipment may be operable to determine that a user has a plurality of Packet Data Protocol (PDP) contexts active and to determine the IP addresses associated with the plurality of contexts. In other embodiments, the picocell is operable to examine other tunneling protocols to recover such information, such a Proxy Mobile IPv4, Proxy Mobile IPv6, or Generic Routing Encapsulation protocol. Thereafter, it is determined whether IP addresses associated with communication traffic from the user equipment uniquely identifies an enterprise context, as opposed to a macro telecommunications service context, and when the IP address associated with communication traffic from the user equipment uniquely identifies an enterprise context, the method and system cause IP packets received from the Internet to be routed to the picocell equipment that services the user equipment via the radio access point and similarly cause IP packets sent from the user equipment associated with the identified enterprise context to be routed directly from the picocell equipment into the enterprise routing environment. The system communicates with an appropriate router to "cause" the IP packets to be routed in the desired fashion.

In one embodiment, the picocell equipment is configured with the IP address of the router responsible for advertizing the IP address range of the enterprise user equipment to other routers on the internet, so that the traffic destined to these IP addresses is routed via that router. The picocell equipment is then operable to communicate with said router and to signal when the enterprise context associated with a specific destination IP address should be routed directly to the picocell equipment. In a more specific embodiment, the signaling exchange uses the RADIUS protocol.

The picocell equipment is operable to perform hand-out operations to allow for IP sessions and other services to continue uninterrupted as the user moves out of the picocell coverage area into the macrocellular coverage area. The method and system store in a database user equipment for which the advertising router has previously been signaled to route directly to the picocell equipment. Thereafter, when it is determined that one such user equipment has been handed-out from the enterprise network, the picocell equipment is operable to signal the advertising router that the packets associated with the IP address should no longer be routed directly towards the picocell equipment.

Technical Specification 25.469 of the 3$^{rd}$ Generation Partnership Project (3GPP) defines the Home Node B Application Part (HNBAP) application protocol for signaling between a Home Node B (HNB) (e.g., a femtocell or picocell) and a Home Node B Gateway (HNB-GW or an Enterprise Controller and the HNB-GW (as will be explained later herein), where the HNB-GW is ultimately in communication with macro service, such as cellular service.

Picocells allow for optimum handling of traffic sent over the picocell for, e.g., optimal routing of voice and/or data. In this context, optimal routing means avoiding having to route through the macro service provider. In many instances, such optimal handling is desirably made available only to enterprise employees that happen to use the picocell infrastructure. The present disclosure relates to enhanced customizable picocell deployments with which it is possible to supply differentiated services to enterprise users/employees/designated others versus those who are not eligible to be supplied with such services.

FIG. 1 depicts a radio access point topology in accordance with an embodiment of the present invention. The figure shows a plurality of Home Node B devices or radio access points (RAPs) 110 that are in communication with a HNB-GW 150. In another embodiment, described later herein, an Enterprise Controller is deployed between the plurality of RAPs 110 and the HNB-GW 150. As further shown, a policy database 200 is provided and, in this embodiment, is in communication with HNB-GW 150. HNB-GW 150 is in communication with macro service provided by a telecommunications service provider 180.

The dashed perimeter in FIG. 1 indicates which portions of the infrastructure may be physically provided within a given enterprise versus those portions under physical control of, e.g., the telecommunication service provider 180. Thus, in the embodiment depicted in FIG. 1, the RAPs 110 and the policy database 200 are physically located on the enterprise premises. However, it is possible, and still within the scope of the present invention that the HNB-GW 150 could be located on the premises of the enterprise. Similarly, the policy database 200 could be located within the service provider's infrastructure. Precisely where particular components are located is not critical to the described embodiments. From a practical point of view, however, it would be expected that individual RAPs 110 would be located within the confines of the enterprise. It is also contemplated that no matter where the policy database 200 is physically located it can nevertheless be accessed and managed by enterprise system managers directly or indirectly via some interface provided by the mobile (macro) service provider.

User equipment 120, such as a cellular telephone, is able to communicate wirelessly using macro service via, e.g., conventional cell towers (not shown) or, as shown, via one of the RAPs 110. As the user equipment is moved from one location to another, the RAPs 110 will hand off to one another (or to macro cell towers) enabling the user to experience continuous communication capabilites.

In accordance with, e.g., the 3GPP specifications, RAPs 110 first register with the HNB-GW 150, and once registered, user equipment 120 can then request registration in a sequence of messages described in connection with FIG. 3.

In accordance with an embodiment, the HNB-GW 150 communicates with policy database 200 to, on the one hand, notify the individual RAPs 110 that the network can support differentiated services for different users, and on the other hand, to identify specific users as those who are eligible for such differentiated services as those users register with the infrastructure. As further shown in FIG. 1, a RAP 110 may communicate with policy database 200, thereby moving this functionality to a different part of the deployment. By the same token, policy database 200 itself could also be embedded in one or multiple RAPs 110, the HNB-GW or the enterprise controller (discussed later herein).

Figure 4:
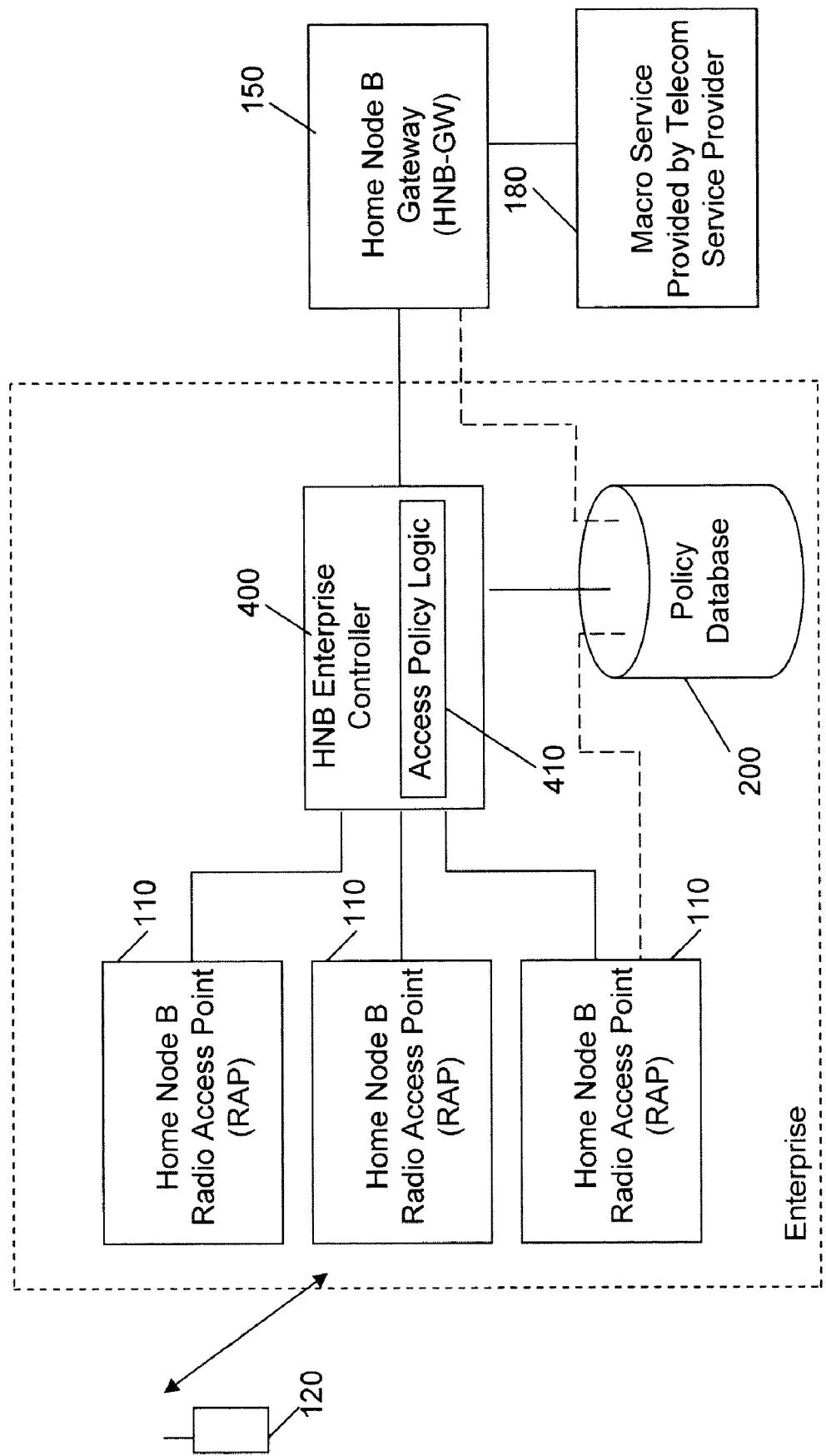
FIG. 4 is block diagram that depicts a controller and access policy logic.

FIG. 4, described further below, but mentioned here for clarity, shows an embodiment that includes an enterprise controller 400 that is disposed between the RAPs 110 and the HNB-GW 150. As will be explained, functionality provided by the HNB-GW 150 can moved to the enterprise controller 400 thereby providing increased control of the picocell deployment to enterprise managers.

As noted previously, there may be a desire to determine which users are enterprise users (or other authorized users) versus those who are not. For those who are enterprise users (as well as for those users known to the enterprise) enhanced services may be available. Thus, generally speaking, there is a need for policy determination as to the service class of a given user attached to a RAP 110. For example, there could be two user service classes: one for public users or one for enterprise users. If the user is a public user, then improved or enhanced services, such as increased bandwidth, may not be provided. On the other hand, if a user is an enterprise user, the improved services might indeed be available.

Embodiments of the present invention permit the segmentation of users into those users who are eligible and those users who are not eligible for enhanced or differentiated services by employing policy database 200. As shown in FIG. 2, policy database 200 comprises, perhaps among other things, a listing of enterprise locations along with associated lists of, e.g., International Mobile Subscriber Identity (IMSI) values for mobile devices that may be brought within range of the RAPs 110 within the given enterprise, and optionally a listing of which improved or enhanced services that a user associated with an identifier is authorized to access. In one embodiment, the improved or enhanced services indicate whether the user is attributed to a group of "gold," "silver" or "bronze." In another embodiment, the improved or enhanced services may indicate that the user is authorized to access local data services, in another, an indication that the user is authorized to directly access the enterprise's IP-PBX (private branch exchange) functions. In other words, the service class may include or be associated with specific configuration settings. Other identifiers including electronic serial numbers, mobile identification numbers (MINs), or telephone numbers could also be used in database 200. In this way, when user equipment 120 (a mobile device) attempts to register with a given RAP 110, the system will first query the policy database 200 to determine the service class of the user equipment 120 by using IMSI as the identifier and, thereafter provide the user equipment 120 with access services according to the service class, e.g. access to enhanced services, such as increased bandwidth, and data and voice local breakout as described above.

In the embodiment shown in FIG. 1, HNB-GW 150 is connected to database 200 that identifies the several enterprises and authorized employees on a per enterprise basis, e.g., and as shown, the database 200 defines an alphanumeric identity of the enterprise and the associated IMSIs (or other identifiers) of the mobile devices of the employees or other authorized users. In this embodiment, the HNB-GW 150 would be aware of the appropriate enterprise based on which HNB the registration request came from since each HNB belongs to a specific enterprise.

Figure 3:
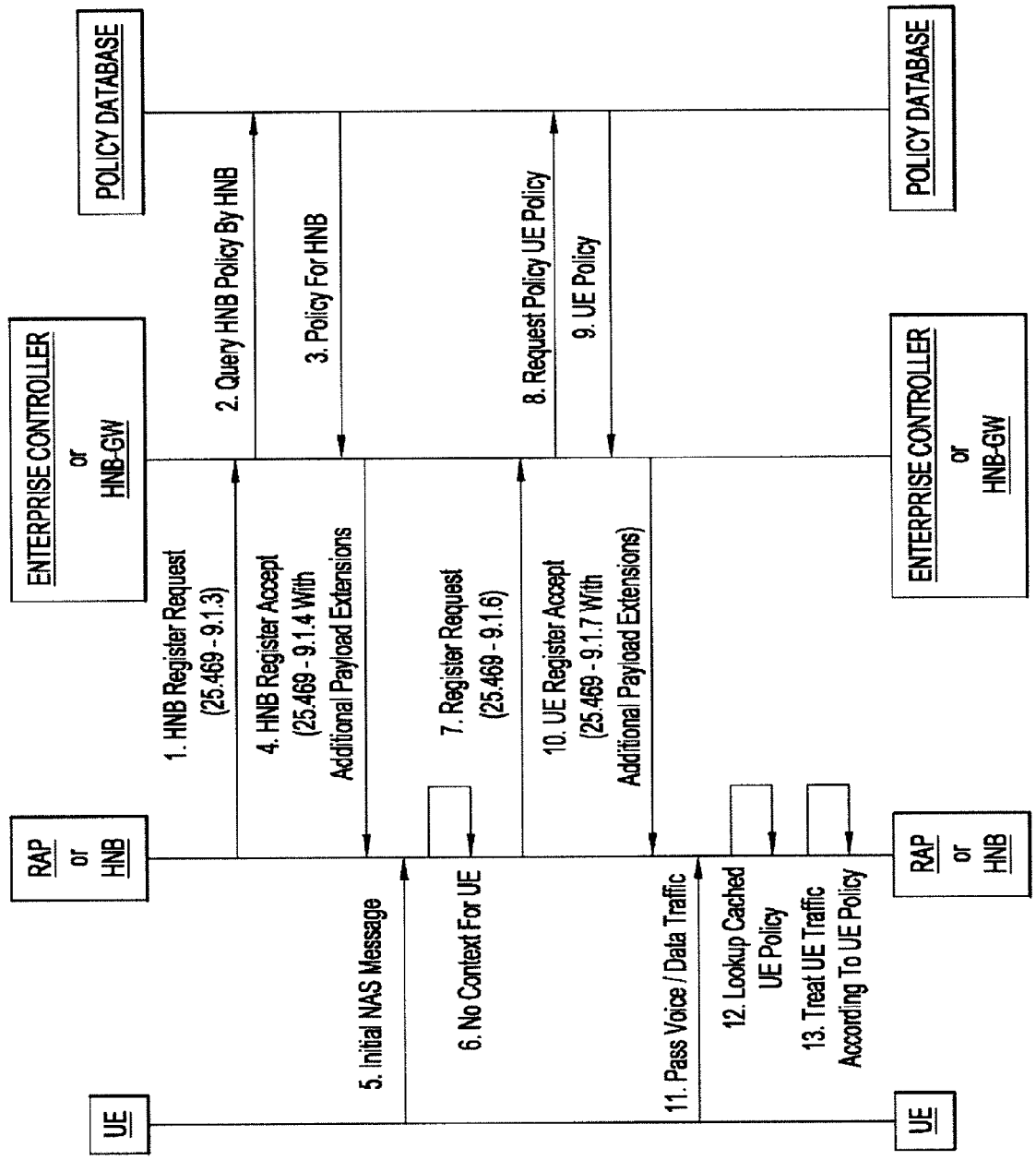
FIG. 3 shows a sequence diagram depicting steps for registering radio access points and user equipment.

FIG. 3 shows a sequence diagram depicting steps for registering radio access points 110 and user equipment 120 in accordance with an embodiment. FIG. 3 depicts as elements, user equipment 120, an HNB (or RAP 110), HNB-GW 150 and policy database 200. Enumerated steps 1-4 in FIG. 3 represent steps for registering an HNB or RAP 110, whereas enumerated steps 5-13 of FIG. 3 represent steps associated with registering and serving user equipment 120.

More specifically, and in the context of 3GPP technical specification 25.469, a single HNB registration is used to register each enterprise picocell. In a different embodiment, a new aggregation component called an enterprise controller 400 (shown in FIG. 4) is introduced between the HNB and HNB-GW. In this case, the RAP and UE registrations are relayed by EC from HNB to HNB-GW.

Thus, in step 1, a HNB sends a HNB Register Request, in accordance with 25.469-9.1.3 to the HNB-GW. During HNB registration, the enterprise identity may also provided to the HNB-GW. This may be defined within the HNB identity field or a separate field used to transport the information. Alternatively, the HNB-GW may be configured to know which HNBs belong to which enterprise.

In response, the HNB-GW, at step 2, may then query the policy database 200 to determine whether this particular picocell deployment is governed by any unique policies. At step 3, the policy database returns any policy to the HNB-GW. Thereafter, at step 4, the HNB-GW, in accordance with 25.469-9.1.4, sends a HNB Registration Accept message to the HNB containing any additional per-enterprise policy, thereby completing the registration process for that particular HNB. The HNB is then operational to cache the per-enterprise policy. Alternatively, such policy information can be configured on every HNB a priori via provisioning mechanisms. Notably, and in accordance with an embodiment, the HNB is now apprised of the fact that this picocell deployment is governed by specific policies, not covered by the conventional technical specification 25.469. For example, the per-enterprise policy may contain the configuration options for each service that is defined by service classes in the policy database 200. In the embodiment with EC 400, the registration message from HNB to EC may utilize messagse in accordance with 3GPP standard 25.469 or other protocol. The messages from the EC 400 to the HNB-GW 150 may operate similarly. In this embodiment, the lookup of the per-enterprise can be performed by either EC or HNB-GW Step 5 in FIG. 3 represents the beginning of the process of user equipment accessing the picocell. As indicated, an initial NAS (Non Access Stratem) Message is sent to the HNB. At step 6, it is determined that there is no context for the user equipment attempting the communication. As a result, at step 7, the HNB sends a User Equipment Register Request message, in accordance with 25.469-9.1.6, to the HNB-GW. Preferentially, the HNB may append the enterprise identity to the User Equipment Register Request message. The HNB-GW is configured to then, at step 8, send a Request User Equipment Policy message to the policy database. Specifically, the HNB-GW is operable to associate the request with a particular enterprise identity, e.g., using the enterprise identity appended to the User Equipment Register Request Message or via associating the SCTP or TCP socket through which the message is received with the enterprise entity or by identifying the enterprise based on knowledge of which HNB identifier belongs to which enterprise. The HNB-GW uses the UE identity included in the UE register request message and consults/queries the database, querying the service class for this UE identity. This Request message seeks information regarding the User Equipment requesting registration. The Request message will include, at least, the IMSI (or other unique identifier) of the user equipment attempting to register and may also include an enterprise identifier.

The database, in turn, and at step 9, will return any policy-specific information with respect to the user equipment, e.g., the service class. The policy-specific information may be a simple yes or no, indicating whether the IMSI value is or is not listed in the database, and thus whether the user equipment having that IMSI is authorized to receive optimal routing services. The policy-specific information could also include message information intended for the user equipment. For example, the user equipment may be notified that it is eligible for differentiated services. In another embodiment, the differentiated service class may indicate that the user is authorized to access local data services, in another, an indication that the user is authorized to directly access the enterprise's IP-PBX functions.

At step 10, a User Equipment Register Accept message, in accordance with 25.469-9.1.7, is sent from the HNB-GW to the HNB. This message preferably also contains an indication of the user equipment service class, which may in turn indicate, for example, that the user equipment is authorized for optimal routing services.

At step 11, the user equipment passes voice and/or data traffic to the HNB. The HNB is configured, as indicated by step 12, to perform an internal check to determine which user equipment policy is applicable. At step 13, the user equipment traffic is then treated according to the applicable policy, e.g., increased bandwidth or default service level, etc.

Thus, as explained, when a user enters picocell coverage, the HNB is responsible for sending a UE registration request to the HNB-GW as per 25.469 directly or via the enterprise controller.

The HNB-GW is then operable to return the authorization results in the UE Registration Accept message. The on-premise equipment is then operable to deliver suitably authorized services to the user. For example, the on-premise pico system may be operable to reserve a certain percentage of resources for enterprise employees. In this case the UE Registration reply simply indicates whether the UE identity belongs to the enterprise or not and appropriate resource caps implemented on the premise based system, e.g., to allow enterprise users to receive preferential resources, which may include radio resources, enterprise LAN bandwidth, and WAN bandwidth.

FIG. 4 shows an embodiment wherein a pico enterprise controller is employed. That is, FIG. 4 is substantially the same as FIG. 1, except all RAPs 110 communicate with (preferably) an on-premise HNB (or RAP) enterprise controller 400 which in turn communicates with the HNB-GW 150. The embodiment of FIG. 4 also depicts that picocell deployment is substantially under the physical management of the enterprise. Specifcially, all the RAPs, the enterprise controller 400 and the policy database 200 are all under the physical control of the enterprise.

Further, FIG. 4 also shows that the enterprise controller 400 includes access policy logic 410. This is the logic that enables the functionality that is described herein with respect to the policy database queries and responses, as well as the functionality described later herein regarding optimal routing. Those skilled in the art will appreciate that the logic 410 may be implemented using software or hardware, or a combination of the two. In the case of hardware, the logic may be implemented using a data processor, e.g., a microprocessor or microcontroller that executes the process logic, e.g., the process logic shown in FIG. 3. In another form, the logic 410 may be implemented by digital logic gates, a programmable gate array device or other programmable or fixed logic device, and which logic is configured to perform the logic functions depicted FIG. 3 and described herein.

As described, an enterprise controller 400 or HNB-GW 150 are preferably configured to query the policy database 200 to determine whether given user equipment that has registered with the RAP/picocell infrastructure is eligible for differentiated services. One type of differentiated services is optimal routing of packets for enterprise employees when served by, e.g., an on-premise picocell system.

Figure 5:
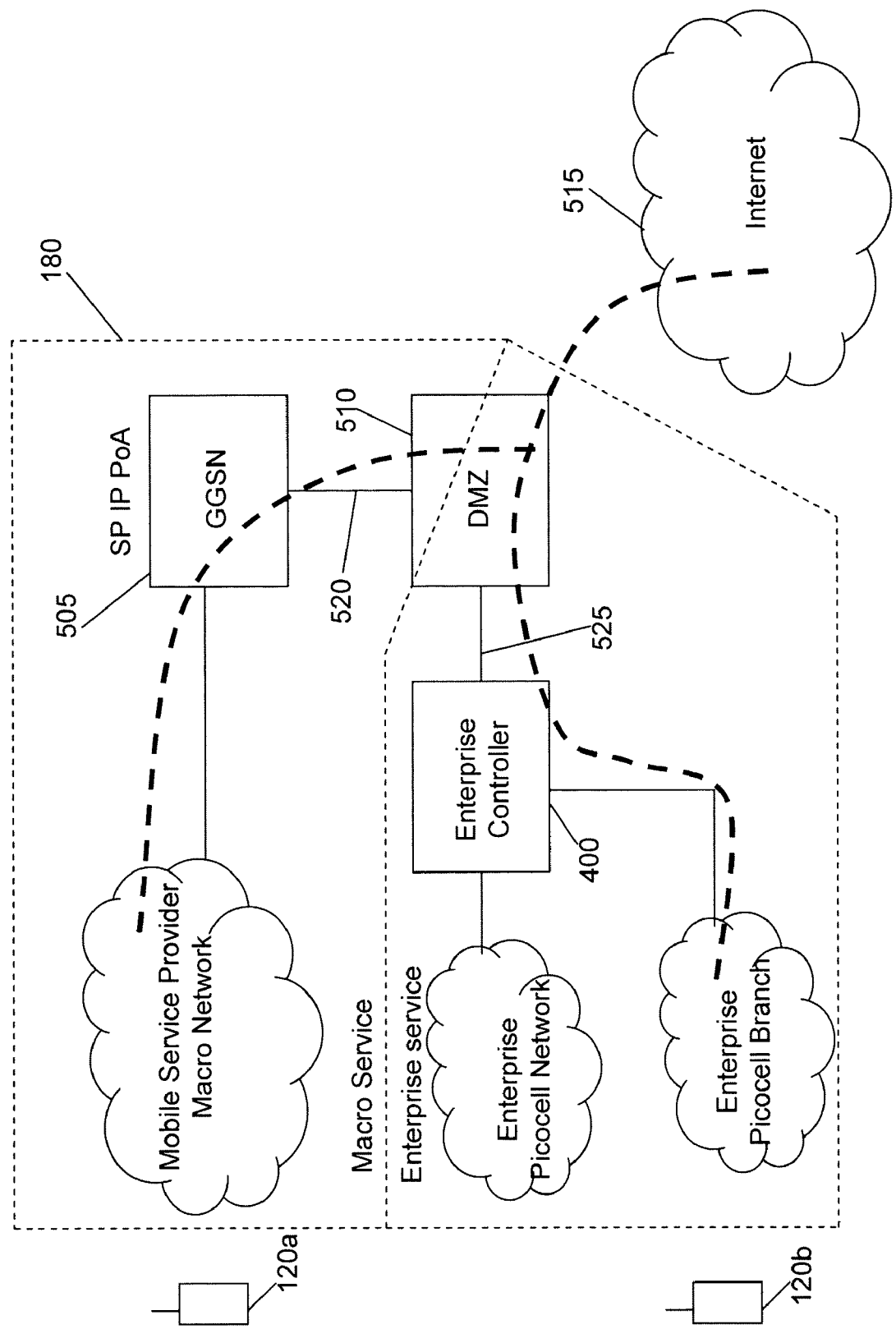
FIG. 5 shows an enterprise virtual private network with augmented policy control.

With reference to FIG. 5, an enterprise mobile virtual private network (VPN) architecture ("enterprise service") is augmented with policy control to optimally handle enterprise users in, in this embodiment, a picocell deployment. As shown, enterprise service is provided whereby an IP tunnel 520 is established between the mobile IP point of attachment (PoA) 505 in the service provider network via, e.g., a Gateway General Support Node (GGSN), and an advertising router (or enterprise "demilitarized zone" (DMZ) router) 510 where the IP address allocated to the user belongs to the enterprise not that of the service provider and internet traffic to such addresses is routed via the enterprise DMZ router. For those users identified as belonging to the class of enterprise employees (or other authorized/eligible users), the enterprise controller 400 is configured to retrieve the IP address allocated to the particular user equipment 120b being served by the picocell deployment. This may be achieved by snooping into IP packets sent over the picocell or by intercepting packet data protocol (PDP) context establishment message exchange during which the IP address is allocated to the user equipment, e.g., delivered in the Protocol Configuration Option.

In cases where the user equipment (e.g., mobile phone) may be authorized to access multiple enterprises, it may well be allocated other IP addresses which are not associated with the enterprise mobile VPN service and which are not authorized to receive optimal handling The enterprise controller 400 is operable to confirm that the IP address of intercepted packets belongs to the same IP address range as advertised by the enterprise DMZ, for example by having an enterprise management interface to allow the enterprise information technology (IT) manager to provide the enterprise controller 400 such information.

The enterprise controller 400 is operable to distinguish between those PDP contexts that are associated with an authorized employee and those that are also associated with an enterprise DMZ IP address.

In situations where the enterprise DMZ IP address does not uniquely identify the enterprise PDP context, e.g., because it uses a private IP address which could be re-used by a second APN service, the enterprise controller 400 is configured to use the destination IP address of a packet to determine whether a PDP context using private source addressing is accessing an enterprise hosted service, e.g., using a public IP address of an enterprise VPN concentrator to identify a PDP context as belonging to an enterprise VPN service.

For those up-link packets that are sent by an authorized enterprise employee, using a PDP context associated with the enterprise DMZ advertised IP address range (e.g., as identified from the management interface), the enterprise controller 400 is operable to switch such packets into an IP tunnel 525 towards the enterprise DMZ 510, instead of via the conventional service provider network 180. That is, instead of packets flowing to the SP IP PoA/GGSN 505, packets are intercepted at the enterprise DMZ 510 and passed directly, via local infrastructure, to, e.g., the Internet 515.

When the enterprise controller 400 identifies that a suitably authorized enterprise employee is present within picocell coverage and that employee has a PDP context active using the enterprise DMZ advertised IP address range, then the enterprise controller 400 is configured to indicate to a router in the enterprise DMZ 510 that, preferably, packets destined towards the identified IP address should be tunneled via tunnel 525 towards the enterprise controller 400 instead of the service provider GGSN 505.

The enterprise controller 400 is then operable to terminate the tunnel from the enterprise DMZ router 510, to examine the IP destination address and to look up the user who has been allocated that IP address. The enterprise controller 400 is then operable to forward the packet to the user equipment 120b attached to the enterprise picocell as shown in FIG. 5.

The enterprise controller 400 is further operable to note when such a user is handed out of the enterprise service network back towards the macro service network. In such instances, the enterprise controller 400 is operable to indicate to the router in the enterprise DMZ 510 that optimal routing of downlink packets via the enterprise controller 400 should be disabled for packets with that particular IP destination address and that normal routing via the service providers IP point of attachment 505 should start or resume.

If the enterprise controller 400 thereafter receives from enterprise DMZ 510 a downlink packet that does not correspond to currently authorized enterprise user equipment, the controller 400 is operable to indicate to the enterprise DMZ router 510 that further packets should not be forwarded to the enterprise controller 400 corresponding to that particular IP address.

It is noted that the policy interface between enterprise controller 400 and enterprise DMZ 510 can be AAA based, e.g., RADIUS or Diamater, or any other protocol. Further, the tunnel interface 525 between the enterprise controller 400 and the DMZ router can be generic routing encapsulation (GRE) or IP-in_IP or IPSec or any other tunneling technology.

Figure 6A:
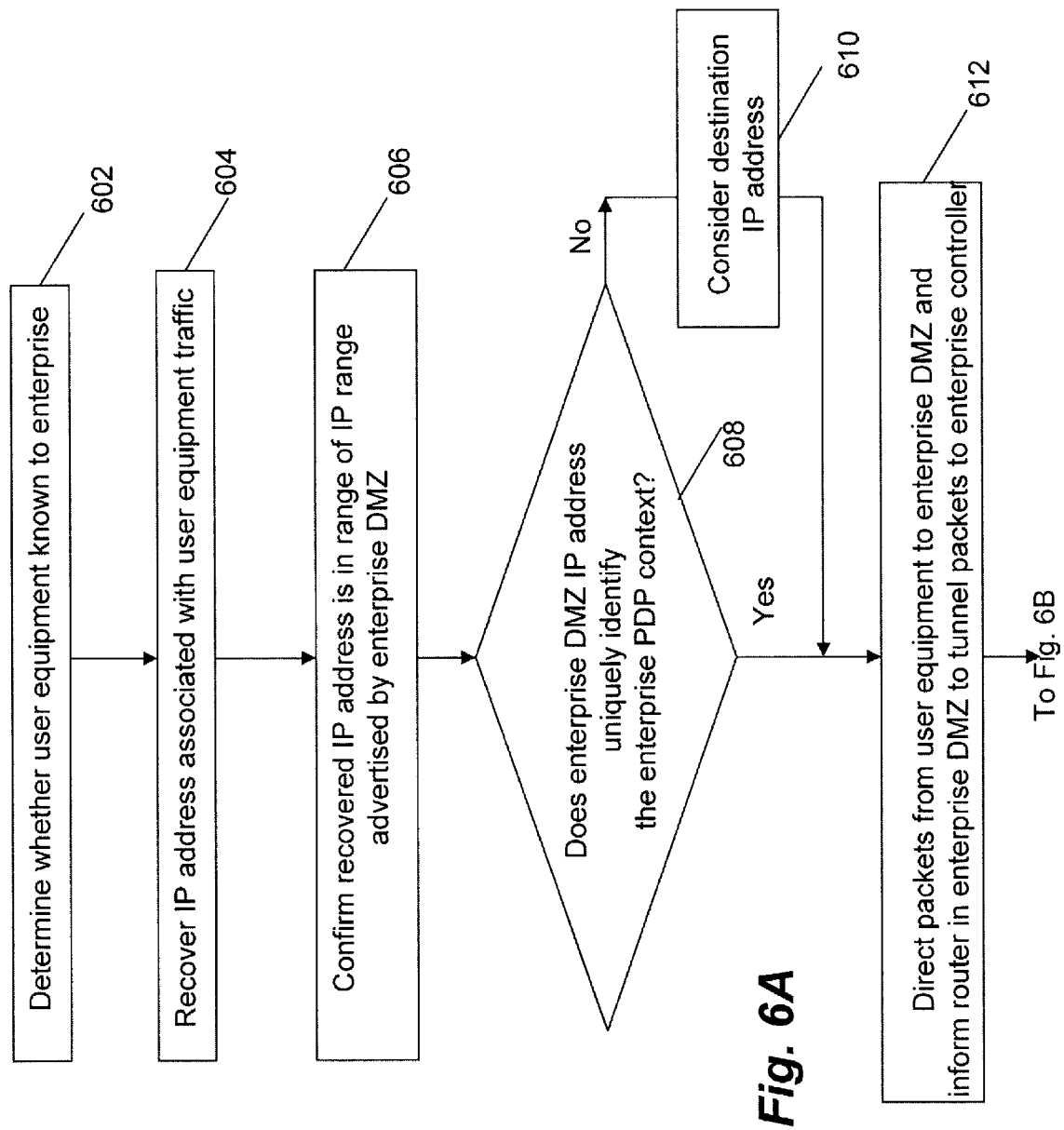
FIGS. 6A and 6B show a series of steps for performing routing.
Figure 6B:
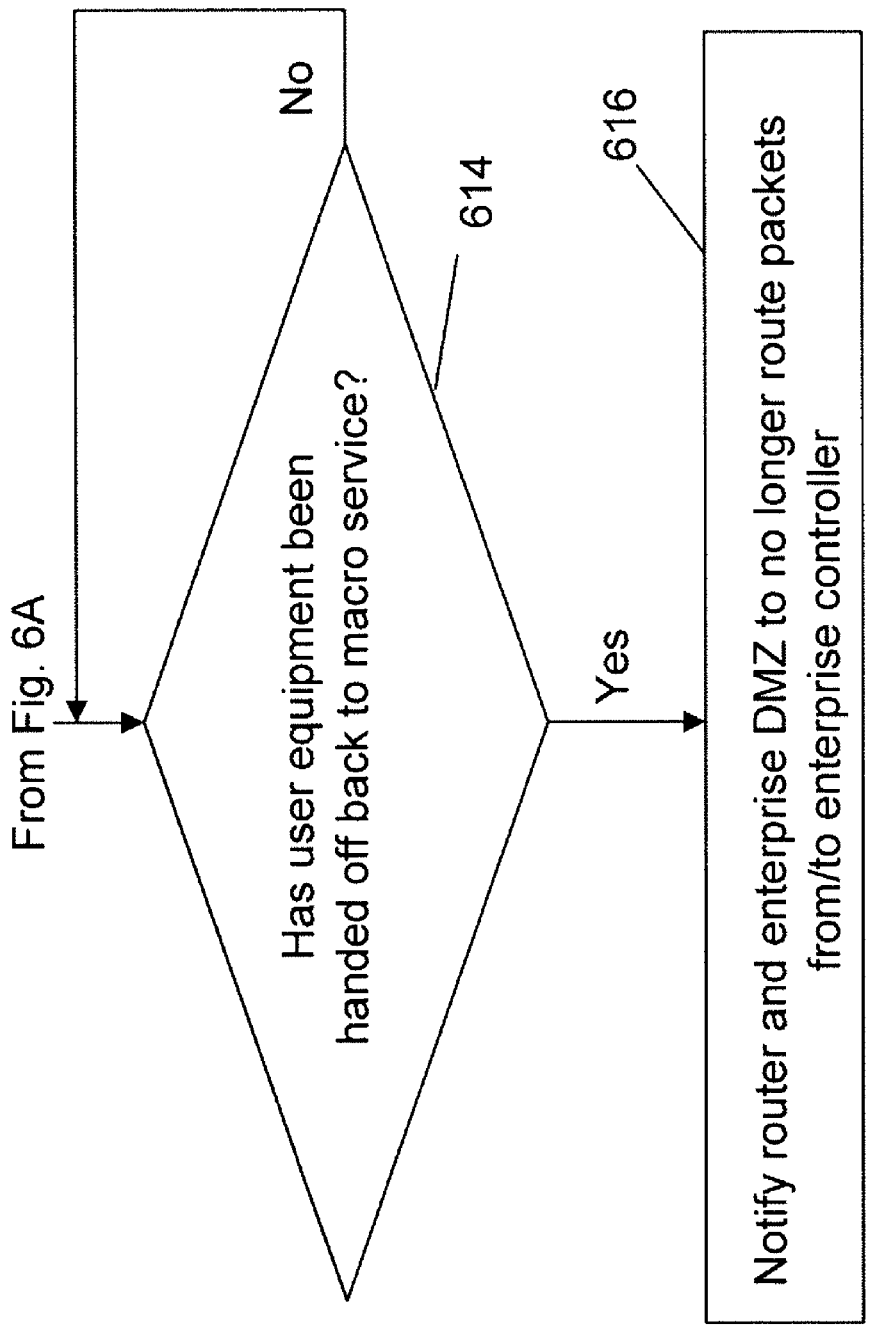

Reference is now made to FIGS. 6A and 6B which show a series of steps for performing the methodology described above with respect to optimal routing. At step 602, it is determined whether user equipment that is registered with the enterprise picocell infrastructure, is known to the enterprise. This knowledge may be gleaned by querying the policy database 200 as explained previously.

At step 604, an IP address associated with user equipment traffic is recovered. This can be accomplished by snooping, as well as other techniques. The goal is to determine whether IP traffic associated with the user equipment can be more optimally routed. In this regard, at step 606, it is confirmed that the recovered IP address is in a range advertised by the enterprise DMZ. In other words, a service provider 180 typically sets aside or reserves a predetermined range of IP addresses for a specific enterprise picocell deployments. Alternatively, the IP addresses are assigned by the enterprise. In this way, the service provider 180 knows to route packets with IP addresses in that range to a HNB-GW or enterprise controller.

At step 608, it is determined whether the recovered IP address uniquely identifies the enterprise PDP context, as some IP addresses may be re-used under some scenarios, as described above. If there is a question regarding the "uniqueness" of the identity, then at step 610, it is possible to consider a destination IP address to ensure that the packet being considered is indeed destined for user equipment registered with the picocell deployment or enterprise service.

Then, after step 610, or immediately after step 608 (assuming the enterprise DMZ IP address was sufficient to uniquely identify the enterprise PDP context), packets from the user equipment 120b are directed from the user equipment 120b to the enterprise DMZ and, further, a router in the enterprise DMZ is informed to tunnel packets to the enterprise controller. In this way, the user equipment is served by data flows that do not pass through the macro service provider, thereby offloading that traffic from the macro service provider and, in an optimal network, improving the speed of the network from the perspective of the user using the user equipment being served by the enterprise service.

Eventually, the user equipment 120b will be handed back to the macro service provider 180. That is, user equipment 120b will transition to user equipment 120a (see FIG. 5) served by the macro service provider 180. Step 614 in FIG. 6B represents this status change. Thus, when user equipment 120b de-registers from the picocell infrastructure, that infrastructure can no longer route data or voice to the user equipment. As such, at step 616, the enterprise controller 400 preferably notifies the enterprise DMZ and associated router to no longer route packets from/to the enterprise controller.

Those skilled in the art will appreciate that the functionality described herein allows picocell traffic to be offloaded from the macro network and further allows enterprise users superior experience when accessing enterprise based applications over on-premise picocell infrastructure.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method, comprising:
determining whether user equipment registered with a radio access point is known to an enterprise other than a macro telecommunications service provider and eligible for differentiated services;
recovering, from an on-going internet protocol (IP) session, an IP address associated with communication traffic from the user equipment;
confirming that the IP address associated with communication traffic from the user equipment is within a predetermined range;
determining whether the IP address associated with communication traffic from the user equipment uniquely identifies an enterprise context, as opposed to a macro telecommunications service context;
when the IP address associated with communication traffic from the user equipment uniquely identifies an enterprise context, causing IP packets received from the Internet to be routed to an enterprise controller that services the user equipment via the radio access point;
monitoring whether the user equipment is handed over to the macro telecommunication service provider; and
notifying a router and an advertising router to no longer route packets from and to the enterprise controller.

2. The method of claim 1, wherein determining whether user equipment is eligible for differentiated services comprises querying a database during a user equipment registration process.

3. The method of claim 2, further comprising querying based on an International Mobile Subscriber Identity (IMSI) value of the user equipment.

4. The method of claim 1, wherein confirming comprises determining whether the IP address falls within a range advertised by an advertising router.

5. The method of claim 1, wherein determining whether the IP address associated with communication traffic from the user equipment uniquely identifies an enterprise context comprises analyzing a destination IP address of a packet and further determining whether the destination IP address is associated with the enterprise.

6. The method of claim 1, further comprising operating the enterprise controller in accordance with $3^{rd}$ Generation Partnership project (3GPP) Technical Specification 25.469.

7. The method of claim 1, further comprising:
receiving a packet from the advertising router;
determining that the packet does not correspond to any currently authorized enterprise user; and
notifying the advertising router that further packets corresponding to an IP address of the packet should no longer be routed to the enterprise controller.

8. A system, comprising:
an enterprise controller;
a plurality of radio access points in communication with the enterprise controller;
the enterprise controller being configured to communicate with an advertising router that can communicate with a macro service provider Internet Protocol (IP) point of access;
the enterprise controller configured to:
determine whether user equipment registered with a selected radio access point is known to an enterprise other than a macro service provider and eligible for differentiated services;
recover, from an on-going IP session, an IP address associated with communication traffic from the user equipment;
determine whether the IP address associated with communication traffic from the user equipment uniquely identifies an enterprise context, as opposed to a macro service context;
when the IP address associated with communication traffic from the user equipment uniquely identifies an enterprise context, cause IP packets received from the Internet to be routed to the enterprise controller that services the user equipment via the selected radio access point;
monitor whether the user equipment is handed over to the macro telecommunication service provider; and
notify a router and an advertising router to no longer route packets from and to the enterprise controller.

9. The system of claim 8, further comprising a policy database that is in communication with the enterprise controller.

10. The system of claim 8, wherein the policy database lists IMSI values for which differentiated services are available.

11. The system of claim 8, wherein the enterprise controller is configured to operate in accordance with $3^{rd}$ Generation Partnership project (3GPP) Technical Specification 25.469.

12. The system of claim 8, wherein the plurality of radio access points are Home Node B devices.

13. Logic encoded in one or more non-transitory tangible media for execution and when executed operable to:
determine whether user equipment registered with a selected radio access point is known to an enterprise other than a macro service provider and eligible for differentiated services;
recover, from an on-going IP session, an IP address associated with communication traffic from the user equipment;
determine whether the IP address associated with communication traffic from the user equipment uniquely identifies an enterprise context, as opposed to a macro service context;

when the IP address associated with communication traffic from the user equipment uniquely identifies an enterprise context, cause IP packets received from the Internet to be routed to the enterprise controller that services the user equipment via the selected radio access point;

monitor whether the user equipment is handed over to the macro telecommunication service provider; and notify a router and an advertising router to no longer route packets from and to the enterprise controller.

14. The logic of claim 13, wherein the logic is further operable to operate in accordance with 3$^{rd}$ Generation Partnership project (3GPP) Technical Specification 25.469.

15. The logic of claim 13, wherein the logic is further operable to query a policy database having a list of International Mobile Subscriber Identity (IMSI) values.

16. The logic of claim 13, wherein the logic is further operable to:
  receive a packet from the advertising router;
  determine that the packet does not correspond to any currently authorized enterprise user; and
  notify the advertising router that further packets corresponding to an IP address of the packet should no longer be routed to the enterprise controller.

* * * * *